Oct. 14, 1969  D. G. KELEMEN  3,472,683
PROCESS FOR APPLYING COUNTERELECTRODES
Filed Nov. 26, 1965
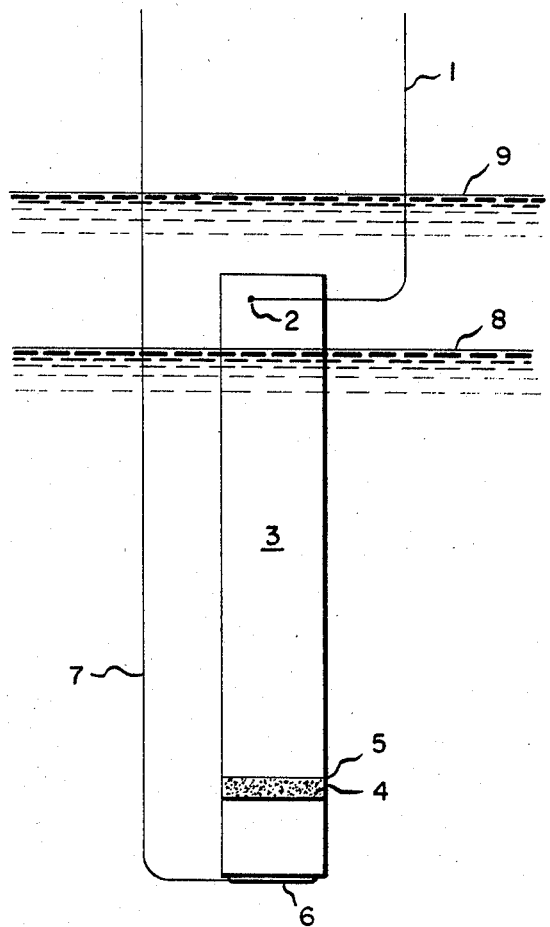
INVENTOR
DENIS G. KELEMEN
BY  Fred C. Carlson
ATTORNEY 3,472,683
PROCESS FOR APPLYING COUNTERELECTRODES
Denis G. Kelemen, Brandywine Hundred, Del., assignor to E. I. du Pont de Nemours and Company, Wilmington, Del., a corporation of Delaware
Filed Nov. 26, 1965, Ser. No. 509,976
Int. Cl. H01g 9/05
U.S. Cl. 117—200
4 Claims This invention relates to processes for applying metal counterelectrodes to metal/insulating barrier structures, and is more particularly directed to an improvement in such processes which include the steps of (1) sensitizing the surface of the insulating barrier, (2) electroless plating said counterelectrode onto said insulating barrier and washing and drying the plated metal/insulating barrier structure, said improvement comprising applying to the metal/insulating barrier structure during at least one of steps (1) and (2) a positive potential not higher than the breakdown voltage of said insulating barrier structure and at least equal to the intended working voltage at which said plated metal/insulating barrier structure is to be used.

In a particular embodiment the metal is a valve metal, the insulating barrier is an insulating oxide layer formed on said valve metal by anodizing it, and the structure, including the counterelectrode plated thereon is an electrolytic capacitor.

In the drawing is shown a schematic diagram, not to scale, of a metal/metal oxide/metal capacitor unit in which the counterelectrode has been applied according to a process of the invention.

Electrolytic capacitors comprise essentially one electrode made of a valve metal such as, for example, aluminum or tantalum; an oxide insulating film electrically formed thereon; and a counterelectrode separated from the first electrode by the oxide film. In the most common electrolytic capacitors a liquid electrolyte, such as sulfuric acid, serves as the counterelectrode. As an advancement in the art, the so-called "solid" capacitors were developed. In the solid-type capacitor a layer of manganese dioxide is deposited upon the metal-oxide film to act as a counterelectrode.

Although these solid capacitors show many advantages over the liquid capacitors, disadvantages are often found in that the thin metal oxide dielectric is severely damaged by the high temperatures and corrosive environments encountered when the manganese dioxide counterelectrode is deposited. Also, the electrical resistivity of manganese dioxide is higher than desirable for best performance of the capacitors.

To overcome the disadvantages inherent in such wet or solid capacitors, it has been proposed to apply metal counterelectrodes to metal/metal oxide surfaces, using electroless plating processes (Masing, Viting, and Young, Dielectrics 1, pp. 45–52; February 1963). It has been found, however, that no matter with what care the metal oxide insulating film is prepared, defective spots in the meetal oxide surface allow localized contacts to occur between the bare, unanodized valve metal and the electrical counterelectrode metal, with "shorts" resulting. While these shorts may be "cleared" by burning off unwanted portions of the deposited counterelectrode by passage of large localized electrical currents when an electric potential is applied to the capacitor, this method of eliminating electrical shorts is not sufficiently reproducible to allow commercial production of metal/metal oxide/metal type capacitors, despite their inherent advantages.

The present invention provides an improved method whereby metal counterelectrodes electrically isolated from the valve metal substrate can be applied to anodically-formed metal oxide surfaces using electroless plating processes, even in the presence of defects in the metal oxide layer. More specifically the invention discloses methods whereby improved metal/metal oxide/metal capacitors are prepared using electroless plating processes with an anodic potential being impressed upon the system during the deposition of the metal counterelectrode. In particular the invention is directed toward improvements in processes of electroless plating of nickel on anodically-formed surfaces comprising tantalum oxide.

In the drawing there is shown a structure, made according to the invention, in which a tantalum lead wire 1 has been spot-welded at 2 to attach it to the anodized metal substrate foil 3, which is in most cases a tantalum foil of about 0.0005″ thickness. A spun-bonded polyester tab 4 has been found very useful in processes of the invention. This is fastened to the anode foil at 5, by means of plastic cement, and its use will be further described hereinbelow. To the opposite end of the spun-bonded polyester tab a flattened nickel wire 6 is fastened, also using plastic cement. This wire constitutes the cathode 7 during certain subsequent process steps. Lines 8 and 9 indicate the limit of liquid level at two steps in the process which will be described in greater detail below.

In the deposition of a metal counterelectrode by electroless plating according to a process of the invention, the previously anodized metal substrate must be held at a positive electric potential during the plating process. This positive potential must be equal to or higher than the intended working voltage at which the capacitor is to be used, and must be not higher than the forming voltage at which the metal substrate was anodized. Under these voltage limitations, the metal being plated by the electroless process will be deposited on the insulating portions of the oxide film, but will not deposit on defective spots where an anodic current is flowing. The result of the invention therefore is the prevention of electrical shorts at defective spots in the insulating, anodically-formed metal oxide film.

As a still further improvement over previously-known methods, it has been found advantageous to maintain the impressed anodic potential during the washing and drying operations subsequent to the deposition of the metal counterelectrode. The anodic potential operates to prevent migration of nickel to defective spots in the anodic film during these operations.

In many of the known procedures for electroless plating of nickel or cobalt, the process has been catalyzed by means of a palladium salt. As a further embodiment of the present invention, it has been found that in cases where a palladium-catalyzed reaction is effected, palladium may be removed from defective spots in the anodic metal oxide film by impressing an anodic potential upon the system prior to electroless plating.

In using the metal/metal oxide/metal type unit to make a complete electrolytic capacitor it is in most cases necessary to roll the metal/metal oxide/metal unit before the complete capacitor can be fabricated. This mechanical handling of the basic metal/metal oxide/metal structure almost always leads to breaks in the anodic oxide film with resulting shorts developing when the capacitor is put into service. As an additional preferred embodiment of this invention, it has been found that shorts, such as are caused by mechanical handling or imperfect deposition of the metal oxide layer, can be eliminated by "deplating" the counterelectrode from defective spots in the film if an anodic potential is applied to the rolled metal/metal oxide/metal unit in an alkaline electrolyte.

In carrying out the electroless plating step in a process of the invention, it has been found very convenient to use a spun-bonded polyester strip as a connector between the metal/metal oxide substrate and the nickel cathode lead. This spun-bonded strip becomes nickel-coated during the process of the invention and forms a conducting bridge between the cathode wire and the counterelectrode deposited on the metal/metal oxide substrate.

In the examples tantalum is merely a readily available, representative example of a valve metal, but it not unique in that it has art-recognized equivalents. The best-known, but by no means the only, equivalents are aluminum, niobium, niobium-tantalum and tantalum-titanium alloys.

An extension of the techniques described here can be applied to metal/insulator/metal structures of many types whenever it is desired to prevent electrical shorts caused by local defects in the insulator. For example, deposited organic film capacitors can be made by coating a metal foil by polymerizing on its surface a suitable gaseous monomer in a glow discharge, followed by the deposition of an electroless nickel counterelectrode in much the same manner as is herein described for anodized tantalum. Applications for such metal/insulator/metal structures are not limited to capacitors; the technique is equally applicable, for example, to metal/metal oxide/metal diodes or hot-electron emitters for vacuum tubes. It is, in fact, not even necessary that the that the insulating barrier one wishes to utilize in a device be a chemically defined separate entity; for example, a semiconductor/metal diode may be constructed by electroless nickel plating against an anodic potential on n-type silicon substrate. In this case, in the absence of light, the silicon-electrolyte interface itself provides an insulating barrier, except at defects; and the electroless nickel will be deposited in such a manner as to form a so-called Schottky barrier diode (see H. K. Henisch, Rectifying Semiconductor Contacts, Oxford Univ. Press, 1957), despite the presence of defects such as dislocations which would normally interfere with its operation. Devices of this type are particularly useful in what are commonly called "integrated circuits" in the electronics industry.

To more fully describe the process of this invention, to illustrate the several embodiments thereof and to characterize the products obtained thereby the following examples of its operation are given:

EXAMPLE 1

Using a known method for the preparation of capacitor anodes, described, for example, in Dummer and Nordenberg, Fixed and Variable Capacitors (McGraw-Hill, 1960), four foil capacitor anodes were formed at room temperature in 0.01% phosphoric acid, $H_3PO_4$. The metal substrate used was capacitor-grade tantalum foil 0.0005" thick x ⅜" x 4", with welded tantalum lead wires of 20 mil thickness. The four tantalum foil coupons were anodized at 2.5 ma./cm.$^2$ to 200 v. The current was then allowed to decay for two hours. Next, the specimens were washed and dried, and were then provided with spun-bonded polyester tabs glued in place with plastic cement, as shown in the drawing. A nickel wire, to serve as cathode lead, was fastened to the spun-bonded polyester tab using a commercial silver paint known as Du Pont #4929.

The four specimens thus prepared for the application of the counterelectrode were clamped into holders suitable for connecting two lead wires to a power supply and were subsequently carried through a sequence of processing steps which are described in detail below. The liquid level for steps 1 through 8 is indicated by line 9 of the drawing. The liquid level for step 9 is indicated by line 8 in the drawing. At the times when a potential was applied to the system, the tantalum anode was positive with respect to the nickel cathode lead.

The anodized coupons were treated according to the following procedures:

(1) Immersed for three minutes in a ½% solution of "Tide," commercial detergent of Proctor & Gamble Company, no potential being applied.

(2) Immersed in 0.01% formic acid solution for 10 minutes, with a positive potential of 170 v. being applied.

(3) Immersed in a solution consisting of 190 g./l. stannous chloride and 80 cc./l. concentrated hydrochloric acid for one minute, no potential being applied.

(4) Immersed in deionized water for one minute, no potential applied.

(5) Immersed in 0.1 mol/l. silver nitrate for one minute, no potential applied.

(6) Step (4) repeated.

(7) Immersed in aqueous solution containing 0.025 g./l. palladium chloride and 1.0 cc./l. concentrated hydrochloric acid for one minute, no potential applied.

(8) Step (4) repeated.

(9) Immersed for 15 minutes under a positive potential of 85 v. in a solution consisting of:

6 g./l. nickelous hydrate
3 g./l. sodium citrate dihydrate
1 g./l. sodium acetate trihydrate
2 g./l. sodium hypophosphite ($NaH_2PO_2$)
5 g./l. ammonium chloride In these process steps, it will be recognized that steps (1) and (2) are standard washing and reheating steps in preparing anodized coupons. Steps (3) through (8) are conventional steps in preparing anodes for electroless nickel plating known as "sensitizing." Sensitizing is a procedure which makes the surface to be plated receptive to the deposition of metal from an electroless plating solution. For each of these steps, many satisfactory variations are known to those skilled in the art, and these steps are given here solely to illustrate one sequence found satisfactory to prepare previously anodized coupons for the electroless plating step (9). For a general discussion of electroless plating see "Electroless Nickel Plating," ASTM Special Technical Publication No. 265, 1959.

In the electroless plating step (9), current flow was about 1 $\mu$a./cm.$^2$, with occasional brief "spikes" up to 1 ma./cm.$^2$. These current spikes were sometimes accompanied by visible sparks. Later inspection of the coupons showed that the loci of these sparks were marked by small spots, each about 0.1 mm. in diameter where the nickel deposit (counterelectrode) appeared to have been blasted off.

After step (9), the specimens were removed from the plating solution, washed in running distilled water and then dried. The spun-bonded polyester tab was found to be completely nickel-plated by the steps given above, and formed a conducting bridge in the plated unit between the nickel cathode wire and the nickel counterelectrode.

The four metal/metal oxide/metal coupons prepared by the given procedural steps were tested using a conventional test set for electrolytic capacitors. Two of the four specimens were shorted, with less than 10Ω resistance with 1½ v. applied between the cathode wire and the anode wire. On the other two specimens, the following results were obtained at 35 v. bias:

Electrolytic Tests of Capacitor Units

| | Capacitance ($\mu$f./cm.$^2$) | Dissipation Factor, Percent | Leakage current ($\mu$a./$\mu$fv.) |
|---|---|---|---|
| Specimen 3 | 0.6 | 0.8 | 0.03 |
| Specimen 4 | 0.6 | 0.8 | 0.01 |

EXAMPLE 2

Four specimens prepared from tantalum foil were anodized and treated as given in Example 1 except that following step (9) the specimens were additionally treated as follows:

(10) The specimens, still under 85 v. potential were transferred from the electroless plating solution of step (9) of Example 1 to a vessel containing deionized water at 85° C. and were held in this wash water under 80 v. potential, the potential being reduced from 85 v. to 80 v. as soon as the specimens were immersed in the washing bath.

(11) While under the 80 v. potential, the specimens were transferred to a second washing bath of deionized water at 85° C. for one minute. At the end of this time the potential was reduced to 70 v.

(12) Still maintaining the 70 v. potential on the specimens, they were removed from the washing bath and air dried for 30 minutes.

These four specimens were tested in the same manner as were the specimens prepared in Example 1. All four were found to be unshorted. At 35 v. bias, the following electrical properties were found:

Capacitance: 0.6 $\mu$f./cm.$^2$ (all specimens);
Dissipation factor: 0.8% (all specimens);
Leakage current: 0.005; 0.006; 0.004; 0.002 $\mu$a./ufv., respectively, for the four specimens.

EXAMPLE 3

Four specimens prepared from tantalum foil were anodized and treated as in Example 1, steps (1) through (7). These specimens were then treated as follows:

(8a) The specimens were immersed in 0.01% formic acid at 85° C., and a potential of 20 v. was applied to the specimens, and gradually increased to 170 v. at a rate of 5 v./sec. The specimens were held under the 170 v. potential for one minute; then the potential was lowered to 85 v., and the specimens were immediately transferred, still under 85 v. potential, to the electroless plating solution of step (9). The electroless plating of step (9) was followed by steps (10), (11), and (12), as given in Example 2.

The four specimens thus prepared were tested, and their electrical properties were found to be almost identical with those of the four specimens of Example 2. However, current spiking, and sparking of the specimens, which had been observed in the processes of both Examples 1 and 2 did not occur. Since localized breakdown of an anodic film, known as scintillation, frequently leads to permanent damage to the film resulting in poor performance of the capacitor under prolonged use, definite advantage in the preparation of capacitor components is realized by including in the process the pre-electrolysis step (8a), of this example.

EXAMPLE 4

Three specimens, one prepared by each of the processes of Examples 1, 2 and 3 were wound into tight rolls each having a 3 mil spun-bonded polyester strip included in the roll to serve as a spacer. These rolled specimens were electrically tested and found to be shorted. All three specimens were then converted into finished capacitor units by the following steps:

(13) The roller specimens were immersed in deionized water and held under reduced pressure (20 mm. Hg) for three minutes to eliminate entrapped air bubbles.

(14) The specimens were removed from the water bath, and immediately immersed in an aqueous solution containing—

7 g./l. citric acid
38 g./l. boric acid
100 g./l. sodium citrate at 85° C.

A positive potential of 10. v. was applied to each specimen in series with a 100 Ω resistor. The tantalum was made the anode with respect to the cathode lead. At periods of 3, 5 and 6 minutes, respectively, the current on the three specimens, which was initially close to 100 ma., dropped below 1 ma. At this point a resistance of 1000 Ω was added in series with each one of the specimens, and the voltage was increased at a rate of 1 v./sec. Whenever the current drawn by any specimen exceeded 10 ma., the first "deplating" operation, that is the application of 10 v. with a 100 Ω series resistance, was repeated. In this manner all specimens were brought to a potential of 65 v. The total number of low voltage deplating operations required for the specimens were one, four, and two, respectively. The specimens were held at 65 v. for five minutes. This was followed by the following steps:

(15) The specimens, still under 65 v. potential, were transferred to a vessel containing deionized water at 85° C. Then the potential was immediately lowered to 60 v., and the specimens were held under these conditions for five minutes.

(16) While under the 60 v. potential, the specimens were transferred to a second deionized water bath at 85° C., the potential was reduced to 50 v. and the specimens held under these conditions for 10 minutes.

(17) Still maintaining the 50 v. potential, the three specimens were removed from the water bath and were air-dried for 16 hours.

(18) The three specimens were vacuum-impregnated with an epoxy resin known commercially as "Hysol" #C9–4453 (trade name of a product of Hysol Corporation, Olean, N.Y.) and subsequently with Hardener #3416, produced by the same company, according to the instructions furnished with these products by the manufacturer. The specimens were allowed to cure at room temperature for 48 hours following impregnation.

The three specimens prepared according to this procedure were tested and electrical properties were determined as follows:

Capacitance: 0.6 $\mu$f./cm.$^2$ for all samples;
Dissipation factors: 1.5%, 1.3%, and 1.2%, respectively;
Leakage currents: 0.004, 0.08, and 0.003 $\mu$A./$\mu$fv., respectively.

I claim:

1. In a process for preparing a metal counterelectrode by electroless plating on the insulating barrier surface of a metal/insulating barrier structure, which process includes the steps of (1) sensitizing the surface of the insulating barrier, and (2) electroless plating said counterelectrode onto said insulating barrier surface and washing and drying the plated metal/insulating barrier structure, the improvement which comprises applying to the metal/insulating barrier structure during at least one of said steps (1) and (2) a positive potential not higher than the breakdown voltage of said insulating barrier structure and at least equal to the intended working voltage at which said plated metal/insulating barrier structure is to be used.

2. In a process for preparing a metal counterelectrode by electroless plating on the insulating barrier surface of a metal/insulating barrier structure, which process includes the steps of (1) sensitizing the surface of the insulating barrier, (2) electroless plating said counterelectrode onto said insulating barrier surface, and (3) immersing the plated metal/insulating barrier structure in an electrolyte, withdrawing and then washing and drying the structure after such withdrawal, the improvement which comprises applying to the metal/insulating barrier structure during at least one of said steps (1), (2) and (3) a positive potential not higher than the breakdown voltage of said insulating barrier structure and at least equal to the intended working voltage at which said plated metal/insulating barrier structure is to be used.

3. The process of claim 1 in which the metal of the metal/insulating barrier structure is a valve metal, the insulating barrier is an oxide layer formed on said valve metal by anodization, and the plated metal/insulating barrier structure is a capacitor.

4. A capacitor fabricated according to a process of claim 1.

References Cited

UNITED STATES PATENTS 3,179,576    4/1965    Huber et al. _____ 117—200 X

WILLIAM L. JARVIS, Primary Examiner

U.S. Cl. X.R.

117—93, 213, 227